Feb. 4, 1958 R. G. MUTTI 2,822,001
HOT AND COLD WATER TEMPERATURE CONTROLLING AND MIXING DEVICE
Filed Feb. 5, 1954 2 Sheets-Sheet 1
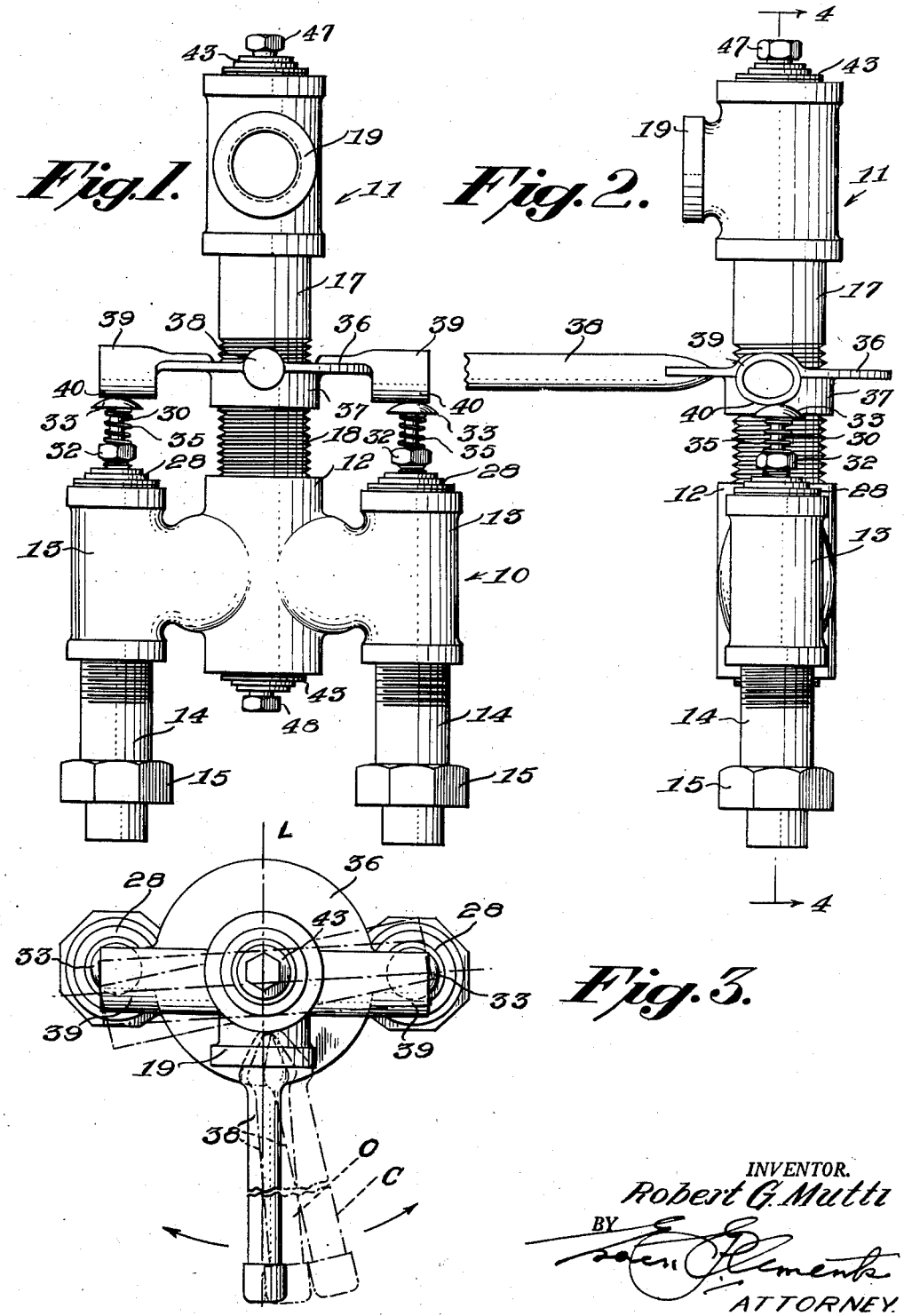
INVENTOR.
Robert G. Mutti
BY
ATTORNEY.

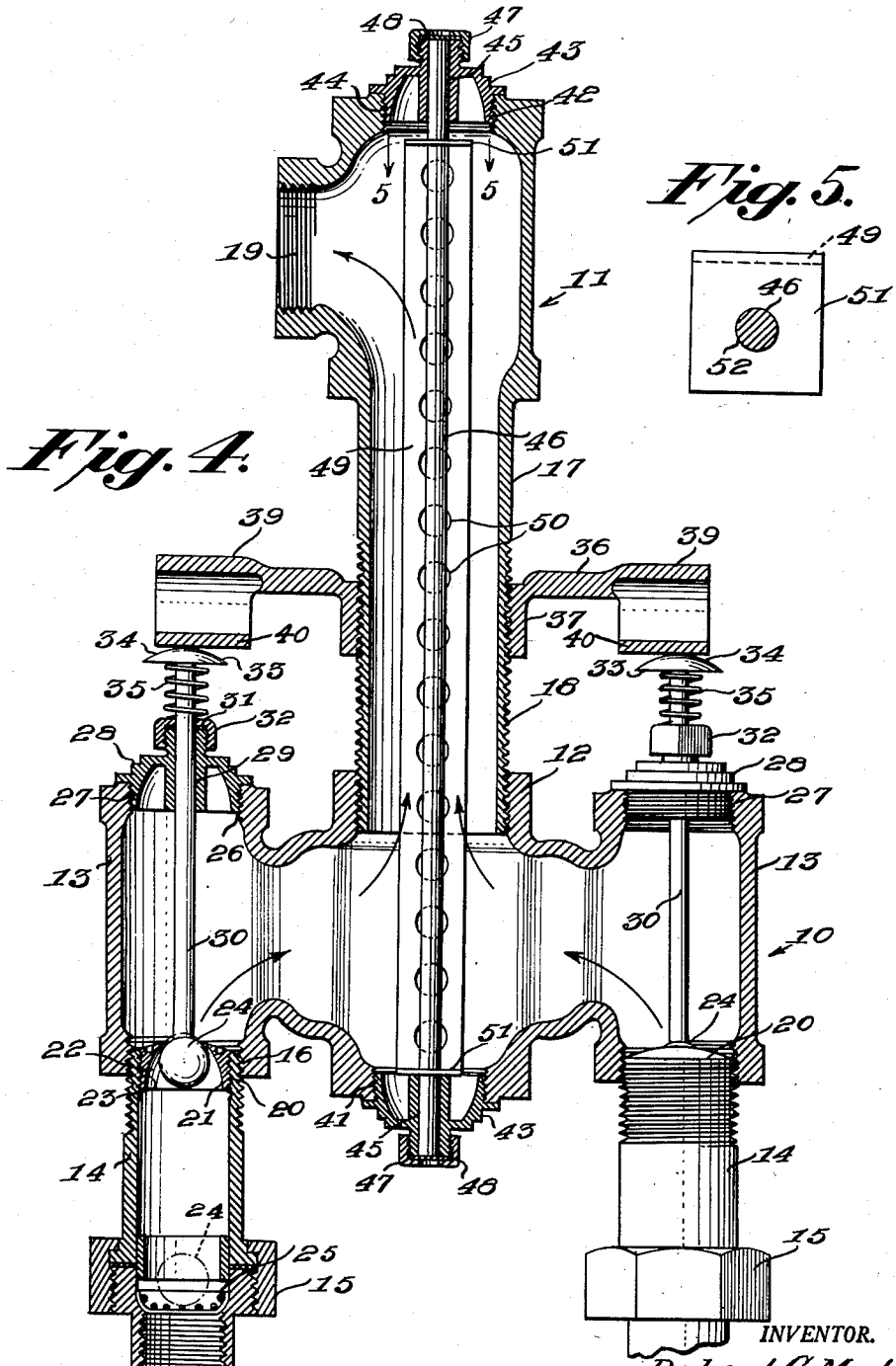

United States Patent Office 2,822,001
Patented Feb. 4, 1958

2,822,001

HOT AND COLD WATER TEMPERATURE CONTROLLING AND MIXING DEVICE

Robert G. Mutti, Logansport, Ind.

Application February 5, 1954, Serial No. 408,468

9 Claims. (Cl. 137—636.1)

This invention relates to a hot and cold water temperature controlling and mixing device.

The invention is more particularly concerned with a variably adjustable water temperature dispensing device adapted for connection to hot and cold water inlet pipes at a point of use and having a mixing outlet chamber associated therefor for supporting a shower or the like.

A primary object of the invention is to provide a hot and cold water feeding and mixing device of this character incorporating hot and cold water valve controlled inlet connections and an externally threaded outlet mixing chamber rigid with and having communication with said inlet connections, and valve control cam means threadedly engaged with said outlet chamber for free rotative movement about the axis thereof for selective or combined control of the valves, as well as for movement axially of the outlet chamber in effecting desired valve operating adjustment thereof and for installation of the device for such operation from any side thereof.

A further object of the invention is to provide a device of the above noted character wherein water pressure operated agitating and mixing means, which may be of various forms, is disposed within and extends axially of the chambered outlet connection.

A still further object of the invention is to structurally improve devices of this character for ease and economy in manufacture and installation, whereby the device may be mounted for use in any required position thereof and provide full operating possibilities and maximum adjustment of parts.

Other objects and advantages of the invention will become apparent in the course of the following detailed description, taken in connection with the accompanying drawings, wherein:

Fig. 1 is a front elevational view of the improved hot and cold water mixing device;

Fig. 2 is an edge elevational view as observed from the right of Fig. 1;

Fig. 3 is a top plan view of the device showing different positions of the valve actuating means in dot-and-dash lines;

Fig. 4 is an enlarged vertical sectional view as observed in the plane of line 4—4 on Fig. 2;

Fig. 5 is an enlarged horizontal sectional view as observed in the plane of line 5—5 on Fig. 4.

Referring now in detail to the drawings, the improved device comprises a lower body member 10 and an upper body member 11.

The lower body member 10 comprises a central generally cylindrical internally threaded receiving and mixing chambered member 12 and a pair of generally cylindrical internally threaded valve housings 13 at opposite sides of the centrally chambered member 12 and integral and in open communication therewith, as is clearly shown in Fig. 4.

The housing members 13 have their axes parallel with the axis of the centrally chambered member 12 and provide a combined receiving chamber for hot and/or cold water admitted thereto through respective externally threaded nipples 14 having internally threaded swivel pipe couplings 15 on their lower ends for connection to hot and cold water inlet pipes, respectively.

While the nipples 14 may be unitary with the members 13 they are preferably threadedly connected thereto as indicated at 16 for facilitating adjustment, repair or replacement of valve seats, later referred to in more detail.

The upper chambered body member 11 is preferably a unitary structure, as is shown in Fig. 4, and includes a vertical extending cylindrical pipe-like section 17 which is externally threaded, as at 18, for a substantial vertical distance from the lower end thereof, for a purpose later to be described, and the threaded lower end portion is utilized to connect same to the internal threads of the upper end of the central member 12 to provide a continuation of the chambered body thereof.

The cylindrical section 17 is also provided with an internally threaded outlet 19 adjacent its upper end and which outlet is shown as opening laterally of the pipe section. It is to be noted at this point that the outlet 19 which is adapted for connection with a shower or the like, not shown, is positioned in Fig. 4 in 90° displaced relation to Figs. 1 to 3 for the purpose of indicating different suitable installation positions of the outlet which can be readily effected upon rotation of the threaded body section 17 in the central member 12.

Each of the two removable nipples 14 is provided on its upper end with a removable valve seat member 20 which consists of an externally threaded plug 21 removably engaged with internal threads on the nipple as is clearly indicated in Fig. 4.

These plugs 21 are each provided with an axial extending opening 22 having a valve seat forming wall 23 of substantially semi-elliptical form and with the wider end of the opening 22 at the lower end of the plug 21, the narrower or seat forming end of this opening being of less diameter than that of a ball valve 24 which is loosely disposed within the nipple 14, and which is normally moved to seat engaging position by water pressure within the nipple.

The nipples 14 are each provided at their lower ends with a screen member 25 for positively retaining the ball valve 24 therein. The upper ends of housings 13 are each provided with an internally threaded opening 26, in axial alignment with the corresponding opening 22 of the plugs 21. Threaded in each of the openings 26 is the lower externally threaded flange 27 of a closure plug 28, which is also provided with an axial bore 29 and in which there is slidably disposed a valve stem 30. The valve stems 30 have their lower ends normally free of the ball valves 24 but are selectively engageable therewith under axial pressure for moving the ball valve 24 from its seat, as will be explained.

Each closure plug 28 is provided with a packing 31 which is retained in position by a cap 32 which is likewise provided with a central aperture having an extension of the valve stem 30 passing therethrough. The valve stems 30 are each provided with a flattened head 33 having an upper spherical surface 34 and a coil spring 35 is disposed between the head and the cap 32 for normally urging the lower end of each valve stem 30 from operative engagement with the ball valve 24 which is normally held in seating engagement in the openings 22 of the plugs 21 by water pressure in the nipples 14.

Valve actuating and controlling means is rotatably and vertically adjustably mounted on the cylindrical mixing section 17, and as shown particularly in Fig. 3, the preferred embodiment thereof comprises a disk-like cam carrying member 36 which is provided with a depending co-axially internally threaded flange 37. As shown in Figs. 1 and 2 this flange rotatably engages with the threads 18 on the cylindrical central body section 17 thereby providing free rotative movement of the disk under such slight friction as is provided by the matching threads on the body section 17 and the flange 37. The disk member 36 is centrally flanged and is provided with a radially outwardly projecting handle 38 for effecting manual rotation thereof upon the supporting body. The disk 36 may be provided with other operating means common in the art such as a knee engageable extension member, or the handle may be detachable for connection to the other side portions of the disk as required, see Fig. 4.

The disk 36 is further provided with a pair of valve actuating cam members 39, one for engagement of each valve stem head 33 upon rotation of the disk and while such cam members are disclosed as being of substantially elliptical form in cross section, it is essential only that they are provided with arcuate cam faces 40 in opposed cooperating relation to the spherical surfaces 34 of the valve stem heads 33 as is indicated in particular in Fig. 2.

At this point, it is to be particularly noted that the center line of the two diametrically opposite cam members 39 is in slightly spaced relation to the parallel diameter of the disk 36 for a purpose, as will later appear.

The lower centrally chambered body member 12 is further provided with a co-axial threaded opening 41 in its lower end wall and the upper end wall of the body section 17 is provided with a co-axial threaded opening 42 preferably of the same diameter as the opening 41 and aligned therewith. In fact the openings 26 of the cylindrical members 13 and the openings 41, 42 are preferred to be all of the same diameter.

A combined closure plug and bearing member 43 which corresponds in form and size to the valve rod carrying closure plugs 28, has an externally threaded flange 44 which is in threaded engagement with each opening 41, 42. These plugs 43 are also provided with axially aligned bearing sleeve portions 45 in which are supported the upper and lower ends of a shaft or spindle 46. As in the valve rod carrying plugs 28, a similar cap 47 is threaded on the axial bearing extension of each plug 43 but to close the central opening in the cap 47 and provide an end abutment for the opposite ends of the rotary shaft 46, a washer 48 is disposed between the cover end of each cap and the corresponding end of the bearing extension.

A water mixing paddle member 49 extends throughout the combined length of the lower centrally chambered body 12 and the cylindrical body section 17. The member 49 may be of various forms and includes in the preferred embodiment an elongated relatively rigid metal strip provided with vertically spaced apertures 50 having its opposite end portions bent to form horizontal flanges 51.

As has been noted the shaft 46 extends axially through the communicating chambers 12 and 17 and the horizontal end flanges 51 are provided with bearing apertures 52 for rotatably receiving the shaft 46, as shown in Figs. 4 and 5, so that the elongated perforated metal strip extends parallel to the shaft but spaced from a side thereof.

The improved device as disclosed is capable of being readily set up for use by merely connecting the union couplings 15 with the hot and cold water pipes and thereafter connecting the outlet 19 from the mixing chamber 17 to a pipe leading to a shower or the like. In this connection, as stated in the objects of the invention, each part of the device as just described, may be so assembled with respect to each other part of the device that all pipe connections may be made to extend in any desired direction therefrom and the required cam handle operation of the valves may be performed from any side of the device as assembled and connected for use.

In operation of the device, therefore, the normal water pressure in the nipples 14 will retain the ball valves 24 in engagement with the valve seats 20 whereby water will not flow into the valve housing members 13—13 and intermediate chambered body members 12 and 17.

The handle manipulated cam carrying disk 36 may thus be rotatably and adjustably mounted on the cylindrical chambered body section 17 in the position indicated by dotted lines C in Fig. 3, or in a similar operative position on the mixing chamber 17 with the handle 38 extending from the opposite side of the device or otherwise as required. Individual or dual control of the valves 24—24 by actuating the stems 30—30 may thus be had, as indicated in dotted lines in Fig. 3.

Hence with the valve handle 38 in the position indicated in full lines in Fig. 3, the cam surfaces 40 will have partially but uniformly depressed both valves 24, as is further shown in the sectional view at the left in Fig. 4. In this position of the valve operating disk both hot and cold water in limited and equal volumes will flow into the central mixing chambers 12 and 17.

Upon movement of the valve handle 38 to the dotted line position O in Fig. 3 the right hand valve will be completely opened while the left hand valve will then be closed, since the cam members 39 and the disk-flange-handle 36—37—38 all rotate about the same point but the center line of the two diametrically opposite cams 39 is in spaced relation to the parallel diameter of the disk 36. This novel arrangement allows for the actuation of the stems 30 either independently or simultaneously. The amount of displacement of the stems 30 by the cam members 39 is varied by the axial position of the threaded-flange 37 on the threads 18 of the central body section 17. It is understood from the foregoing that the springs 35 act automatically to raise the valve stems and allow the valves 24 to seat whenever the valve stems are not subject to pressure by the cam faces 40.

As indicated by the arrows in Fig. 3, the handle 38 may be moved either to the left or right in effecting the above described control of the respective valves 24—24. Hence it is apparent that the handle 38 has only a relatively small angular range of movement in effecting complete control of the two valves, such angular range being limited to the axes of the handles at positions C at opposite sides of the center line L.

It is to be particularly observed by reference to Fig. 4 that the mounting of the disk 36 on the pipe section 17 by means of cooperating threads on the disk flanges 37 and the cylindrical body of the mixing chamber section 17, provides for fine relative adjustment of the cam surfaces 40 and the valve stem heads 33. Thus, upon clockwise rotation of the disk 36 through an angle of 180° or 360° the same may be moved slightly axially upwardly or downwardly on the section 17 with a resulting lesser or greater depression of the valves 24 when the manipulating handle 38 is moved to the solid line position or dotted line position O in Fig. 3.

While the threads 18 are shown substantially spaced for facilitating disclosure, they are in practice relatively close as compared to the thickness of the curved surface 34 of the valve stem head 33 so as to provide sensitive relative adjustment of the cam faces 40 of the disk 36 and stem head 33.

The improved device provides for easy and accurate control of the valves by a single hand as has been explained and therefore any desired water temperature can be readily secured by slight movement of the handle to the left or right of the center line L in Fig. 3, and instantly delivered through the outlet 19 of the mechanical mixing chamber 17, the device providing for very sensitive adjustment with a minimum of effort.

With reference to the prompt delivery of water to desired temperatures it will be noted that water upon entering the centrally chambered member 12 will instantly cause the elongated eccentrically pivoted strip member 49 to rotate about the spindle 46 in the chambers 12 and 17, with the result that the oppositely admitted hot and cold water in its generally upward movement through the chamber section 17 will be uniformly mixed thereby avoiding hot or cold zones in the water merging from the outlet 19 to a shower or the like.

While I have disclosed my invention in accordance with a single specific structural embodiment thereof, such is to be considered as illustrative only and not restrictive, the scope of the invention being defined in the subjoined claims.

What I claim is:

1. A hot and cold water mixing device comprising a body member defining a chamber and having hot and cold water inlet connections, valve means individually controlling the flow of hot and cold water into said chamber and including valve stems having operating cam heads disposed externally of the body member, said body member being provided with an externally threaded tubular water outlet connection disposed intermediate said valve stems, valve actuating and control means comprising a member having internal threads engaged with said external threads of said tubular water outlet connection and rotatably and axially adjustably disposed thereon for valve operating rotation and adjustable movement axially thereof, and cam means on said internally threaded member engageable with said cam heads for operating said valves upon the rotation of said internally threaded member.

2. The structure according to claim 1, wherein said valve stem heads are provided with outer spherical surfaces and said cam means comprises convex surfaces on said internally threaded member which are opposed to the spherical surfaces of said valve stem heads.

3. The structure according to claim 1, wherein the axis of said outlet connection is disposed centrally of the axes of said valve stems and in a common plane therewith, said cam heads being provided with outer spherical cam surfaces and said internally threaded member comprises a disk having convex cam surfaces opposed to said spherical surfaces of said heads with the axes of said convex cam surfaces being in a plane spaced from a diametrical plane which is parallel therewith and perpendicular to the surface of the disk.

4. The structure according to claim 1 together with an elongated water mixing means disposed within said body member and rotatably supported therein.

5. The structure according to claim 4, wherein said mixing means comprises an elongated strip member provided with spaced apertures throughout the length thereof.

6. A hot and cold water proportioning and mixing device comprising two inlet valves, a body member defining an outlet chamber in communication with said valves, and a valve controlling member threadably mounted on said body member for rotation through 360° and longitudinal axial adjustment with respect to said body member to control said valves, said controlling member having separate valve actuating means rotatable therewith on said body member for both single and combined actuation of said two valves and at distinctively opposite points on said body member.

7. A hot and cold water mixing device comprising a first member having a centrally located mixing chamber and a plurality of valve housings spaced from and in open communication with said mixing chamber and adapted to be connected to hot and cold water inlets, spring biased cam actuated valve means disposed in each of said housings independently controlling the flow of water through their respective housings and each valve having a spherical shaped head projecting beyond each housing, a second member having a cylindrical portion secured to said mixing chamber and an outlet in said section in open communication with said mixing chamber, said cylindrical portion having external threads thereon throughout a substantial length thereof, a multi-positioned valve actuating and controlling means threaded to said cylindrical portion and rotatable and longitudinally adjustable thereon, said valve actuating means having a plurality of cam surfaces, one for each spherical head of said valves, disposed relative to said spherical head surfaces and selectively actuating a predetermined number, one or all, of said valves upon the positioning of said valve actuating means on said cylindrical portion, said cam surfaces of said valve actuating means being diametrically opposite each other and controlling and actuating the respective valves.

8. The structure defined in claim 1, wherein said cam means on said internally threaded member is disposed so that a center line between diametrically opposite cam means lies in spaced relation to a parallel diameter of the valve actuating and control means.

9. The structure defined in claim 1, wherein said internally threaded member is of disc-like configuration having a depending coaxial internally threaded flange and a handle depending radially therefrom and disposed in a radial plane common with the cam means.

References Cited in the file of this patent

UNITED STATES PATENTS

| 508,584 | Stevens | Nov. 14, 1893 |
| 1,929,054 | Carmody | Oct. 3, 1933 |
| 2,171,992 | Rantine | Sept. 5, 1939 |
| 2,679,865 | Griffith | June 1, 1954 |

FOREIGN PATENTS

| 39,338 | Switzerland | of 1907 |
| 235,126 | Germany | of 1911 |